Oct. 20, 1970  J. T. MAYNARD  3,535,610
DUAL PULSE GATING OF A FULL WAVE OF A CONTROLLED
RECTIFIER SYSTEM
Filed Nov. 13, 1967  2 Sheets-Sheet 1

INVENTOR
JOHN T. MAYNARD
BY
Andrus & Starke
Attorneys

Oct. 20, 1970    J. T. MAYNARD    3,535,610
DUAL PULSE GATING OF A FULL WAVE OF A CONTROLLED
RECTIFIER SYSTEM
Filed Nov. 13, 1967    2 Sheets-Sheet 2
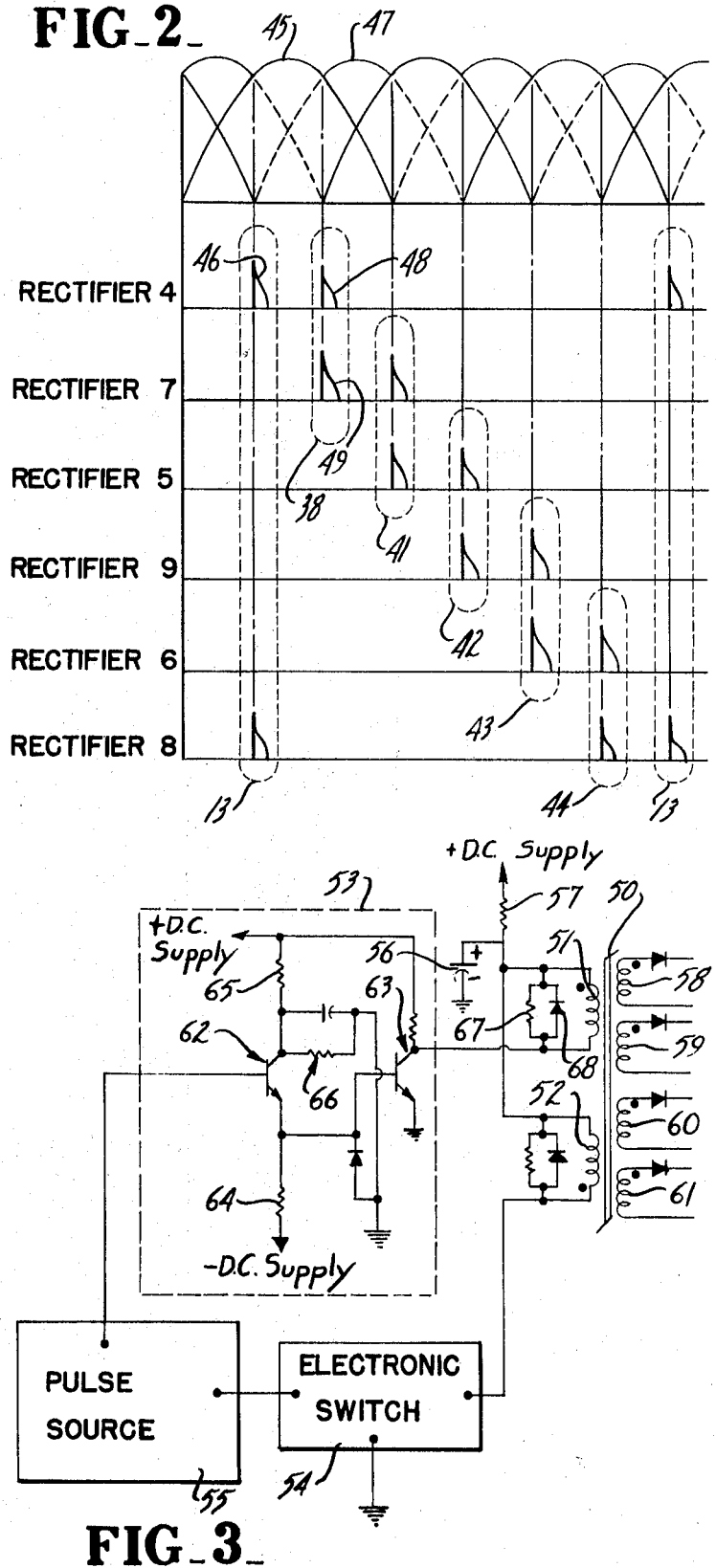
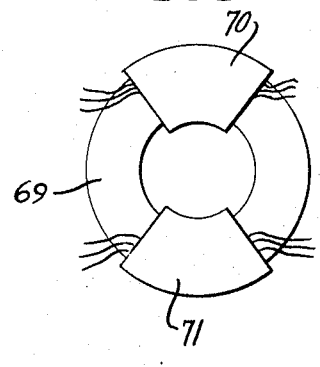
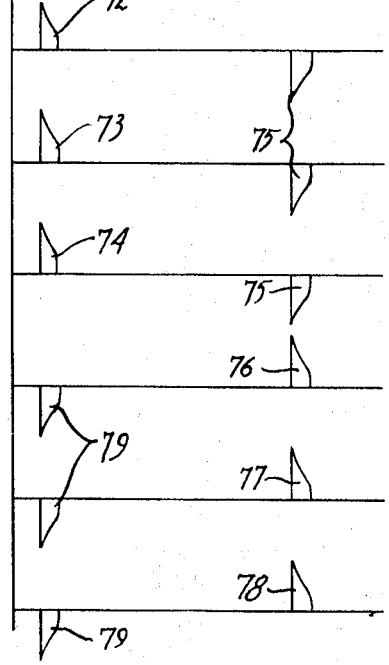
INVENTOR
JOHN T. MAYNARD
BY
Andrus & Starke
Attorneys United States Patent Office 3,535,610
Patented Oct. 20, 1970

3,535,610
DUAL PULSE GATING OF A FULL WAVE OF A CONTROLLED RECTIFIER SYSTEM
John T. Maynard, New Berlin, Wis., assignor to A. O. Smith Corporation, Milwaukee, Wis., a corporation of New York
Filed Nov. 13, 1967, Ser. No. 682,185
Int. Cl. H02m *1/08, 7/20*
U.S. Cl. 321—5                      8 Claims

ABSTRACT OF THE DISCLOSURE

Six silicon controlled rectifiers are connected in a three-phase bridge with a gate driver for each rectifier. The drivers are interconnected to provide a first pulse to the related rectifier and a second trailing pulse to another rectifier. Each gate driver includes a capacitor connected to a D.C. source to charge the capacitor. A Darlington circuit transistor switch is connected in series with the primary of a pulse transformer across the capacitor. The switch is turned on by an appropriate pulse to discharge the capacitor and form a voltage signal in a pair of secondary windings superimposed on the primary winding and connected by steering diodes to the related rectifiers. Two transformers may be wound on opposite sides of a single toroid core and with a common capacitor connected to the primary windings.

---

This invention relates to a gating system for controlled rectifier means and the like and particularly to an improved system for gating of a polyphase full wave rectifier system for energizing a direct current (D.C.) load.

Controlled rectifiers have found wide application in the conversion of alternating current into a controllable D.C. potential or current. In such control systems, a plurality of controlled rectifiers is interconnected between the incoming alternating current power lines and the load to carry the alternate half cycles. The controlled rectifiers each includes an individual gate which is fired at the proper time during the appropriate half cycle to conduct and carry the corresponding portion of the half cycle. Thus, by controlling the phase angle at which the rectifiers are fired, the average D.C. power supplied to the load is readily controlled. The gates of a controlled rectifier may be readily fired by the application of a positive D.C. potential between the gate and cathode. In certain applications, the anode current may rise rather rapidly upon the initial turn-on of the controlled rectifier. Under such cases, it is important that a heavy or large gate current drive the rectifier on in order to minimize the damage or failure of the device as a result of the change of current with time or the $di/dt$ effect. The heavy gate current is necessary to turn on a larger than normal portion of the total cross section of the controlled rectifier and to thereby minimize the current density.

In a three phase alternating current bridge circuit with full wave rectification, each controlled rectifier may be required to conduct successive different half cycles or phase voltages. Although the commutation would be such that normally the conducting SCR would not turn off, it may happen that it will tend to turn off and the application of the next phase voltage will result in a relatively concentrated current density and a portion of the controlled rectifier with a resulting $di/dt$ failure effect.

The present invention is particularly directed to an improved concept of double pulsing to positively insure continued operation of the proper SCR under high anode current conditions and particularly to an improved magnetic pulsing circuit for providing proper pulsing or triggering of a full wave bridge network.

Generally, in accordance with the present invention, a gating network is provided having a plurality of individual drivers for appropriate individual rectifier means of the full wave bridge rectifier. The drivers are interconnected to provide both the leading edge pulse of one rectifier means and a trailing pulse for the preceding rectifier means. As a result of this interconnection, it is only necessary to determine the sequence for the firing of the leading edge pulse for any particular rectifier driver and the related rectifier of a conducting pair, the latter being fired automatically and simultaneously.

In accordance with a particularly novel aspect of the present invention, each gate driver includes a suitable logic switching circuit adapted to receive a digital signal pulse for firing of the related rectifying bridge network or related controlled rectifiers. Each gate driver includes a pulse transformer including a square loop core having a primary winding interconnected to a pulse source through an electronic switch which is actuated by the incoming signal pulse. In a preferred construction, the primary winding is connected in series with a capacitor to a D.C. supply. An electronic solid state switching circuit is connected to discharge the capacitor and thereby establish an output pulse into the core structure. A pair of secondary windings is close coupled to the primary winding on the square loop core. A first steering diode network connects the one secondary winding to a particular rectifier. The other winding is similarly connected by suitable diodes or the like to the related controlled rectifier which is to conduct simultaneously with the first rectifier.

Further, one of the windings is interconnected to a corresponding winding and output of another gate driver to simultaneously establish a pulse to the related controlled rectifier. Consequently, each controlled rectifier is provided with a related gate driver and in addition is interconnected to be driven from an appropriate driver related to a different controlled rectifier. The interrelationship is such that a pair of the controlled rectifiers is always fired even though the one rectifier will normally still be on. The double plusing technique positively insures that the commutating rectifier is turned on sufficiently to properly conduct the relatively high anode currents. In order to provide a high rise time, the pulsing transformers are preferably formed with toroid cores having a primary winding and a pair of secondary windings wound thereon in close coupled relation.

Applicant has found that the circuit components can be minimized while maintaining reliable output control by using a common core for two of the driver pulse transformers. In a preferred construction of this aspect of the present invention, a pair of primary windings would be wound on diametrically opposite sides of the toroid and interconnected to a pulse source through separate switching networks. The secondary windings are wound in close coupled relationship to the associated primary windings and otherwise connected into the circuit in essentially the same manner previously noted. The switching network selectively and alternately connects the primary windings in the discharge circuit of a pulse source such as a periodically charged capacitor to provide the properly timed pulses for gating of the related controlled rectifiers. The primary windings are wound such that the current through the one primary sets the core and the current through the alternate winding resets the core. As a result of the alternate energization of the windings, the core will be properly set and reset in continuous sequence.

The present invention has been found to provide a proper D.C. path through the rectifier under continuous and discontinuance current conditions as a result of the provision of a pair of gated pulses.

The drawings furnished herewith illustrate preferred constructions of the present invention in which the above advantages and features are clearly disclosed as well as others which will be clear from the subsequent description.

In the drawings:

FIG. 2 is a graphical illustration showing the applied anode voltages of the rectifier and the related pulse control for maximum output of the bridge rectifier;

FIG. 3 is a schematic circuit diagram showing a dual gate driver transformer which can be employed to replace a pair of the separate transformers shown in FIG. 1;

FIG. 4 is a diagrammatical illustration of a toroid core structure constructed to incorporate the pulse transformer of FIG. 3; and FIG 5 is a graphical illustration of the input-output characteristics of the circuit shown in FIG. 3.

Figure 1:
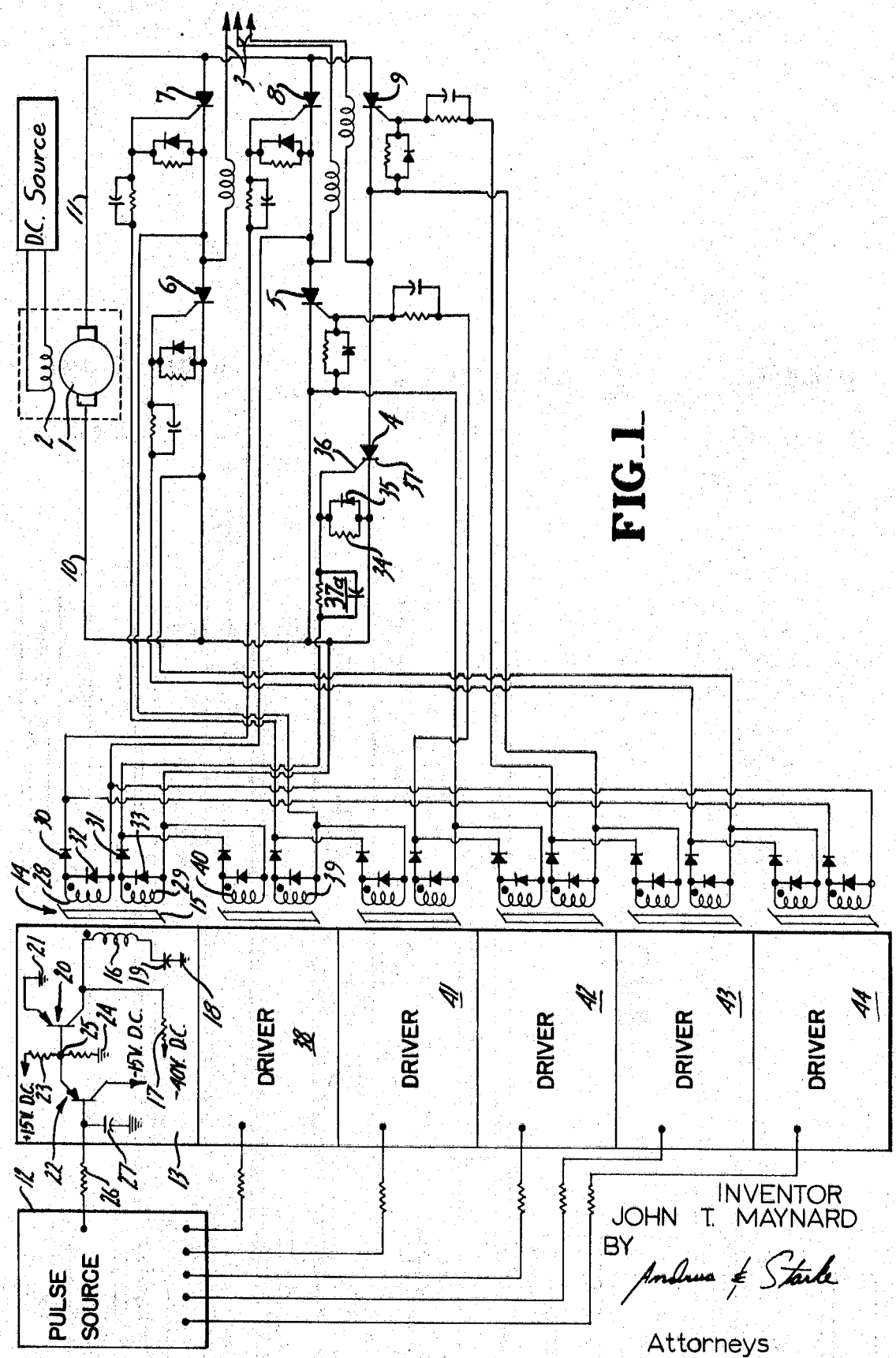
FIG. 1 is a schematic circuit diagram showing the present invention applied to a full wave three phase bridge rectifier network for controlled energization of the armature of a D.C. shunt motor.

Referring to the drawings and particularly to FIG. 1, the present invention is shown applied to the controlled energization of an armature 1 of a D.C. shunt motor having a field 2 connected to any suitable fixed direct current energizing source. The armature 1 is adapted to be energized from a three phase power supply shown schematically by the incoming phase lines 3. The armature 1 is connected to the lines 3 by a full wave bridge rectifying network including six silicon controlled rectifiers 4–9 respectively which are interconnected in rectifying pairs between a pair of D.C. output lines 10 and 11 with the phase lines interconnected to the junction of the rectifying pairs in accordance with well known circuit connection. The controlled rectifiers are gated or fired to conduct at appropriate portions in each half cycle to apply a preselected current and voltage to the armature 1. Each of the rectifiers is of the usual construction having an anode, cathode and gate with the anode to cathode circuit connected in the main conducting circuit between the lines 3 and the armature 1 and with the gate to cathode circuit interconnected to a suitable sequenced pulse source 12 by a related gate driver 13 which particularly forms the subject matter of the present invention. As each of the gate drivers 13 is similarly constructed, a single gate driver is shown in detail to clearly illustrate the present invention with the other portions of the gate drivers only being shown in sufficient detail to clearly illustrate the interconnection between the several gate drivers and the rectifier circuit.

In accordance with known operation, the rectifiers for any given phase are paired to conduct. For example, rectifier 4 and rectifier 8 are fired to conduct current from the lowermost line 3 to the centrally located power supply line 3, the current path being from the lower terminal through the rectifier 4, the armature 1 and back through the rectifier 8 to the intermediate terminal associated with the intermediate line 3. The next phase of voltage will be from the lower line 3 to the upper line 3 and this would include the circuit from the lower terminal through the previously conducting rectifier 4, the armature 1 and rectifier 7 to the upper terminal associated with the three phase power supply. The rectifier 4 thus conducts during portions of the succeeding phase voltage in the three phase sequence, and if maximum output is being supplied, the rectifier 4 will in fact not turn off but rather commutate from the first phase to the second phase. However, if maximum output is not being applied, the current during the latter part of the first phase voltage may be reduced and tend to establish a discontinuity in the conduction. However, the positive voltage of the next phase is near its peak and tends to create a large current flow and high di/dt particularly in the case of low inductance loads, and if the conducting rectifier 4 is not still fully on, large current densities may be formed with destruction of the rectifier. In accordance with the present invention, the several gate drivers 13 are interconnected such that each gate driver generates the leading pulse and through interconnection to the other gate drivers provision of the necessary trailing pulse to maintain continuous conduction of the appropriate controlled rectifiers.

More particularly, in the illustrated embodiment of the invention, each gate driver 13 includes a pulse transformer 14 having a square loop core 15. A single primary winding 16 is wound on the square loop core 15 and interconnected to a negative direct current voltage source or supply through a resistor 17. The opposite end of the primary winding 16 is connected to ground 18 through a pulsing capacitor 19. Thus, the D.C. supply charges the capacitor 19 to a selected level and within a given time constant depending upon the value of resistance and the capacitor. A power or discharge transistor 20 is connected in series with the winding 16 and the capacitor 19 to a ground 21 such that the charged capacitor is discharged through the winding 16 when transistor 20 is biased on. The illustrated transistor 20 is a PNP variety having the emitter to collector circuit connected between the top side of the winding 16 and ground 21. The base of the transistor 20 is connected to the pulse source 12 through a gate driver transistor 22 which in turn is connected to the pulse source 12. A turn-off bias is provided on the power transistor 20 by a pair of series connected resistors 23 and 24 connected between a D.C. bias power supply and ground with the junction 25 of the resistors connected to the transistor base. The value of the resistors 23 and 24 is suitably selected to provide a slight positive bias on the base with respect to ground to insure turn-off of the transistor. The hold-off bias provides anti-leakage control as well as elimination of possible secondary voltage breakdown of the power transistor and thus is a stabilizing network.

The gate driver transistor 22 is also shown as a PNP variety transistor connected in an emitter follower configuration with the collector connected to a suitable negative volt supply and the emitter connected to the base of the power transistor 20. A resistor 26 couples the base of the gate driver transistor 22 to the pulse source 12. A small noise or transient bypass capacitor 27 may be connected between the input side of the transistor 22 and ground.

In the absence of an appropriate negative pulse signal at the base of the gate driver transistor 22 the transistor 20 will be off. The positive bias provided by the voltage dividing resistor 24 will positively hold the power discharge transistor off. The D.C. power supply then charges the capacitor 19 through the resistor 17 and the primary winding 16.

When the appropriate rectifiers 4 and 8 associated with the first gate driver 13 are to be fired, a negative pulse signal is applied to the base via resistor 26 which turns on the transistor 22. This connects the base of the discharge transistor 20 to the negative voltage supply causing it to conduct heavily. When the transistor 20 conducts, the capacitor 19 rapidly discharges through the primary 16 and establishes a pulse signal in a pair of secondary windings 28 and 29. The transformer windings 16, 28 and 29 are shown with polarity dots in accordance with the usual convention to show the positive ends of the windings during the period of capacitor discharge. Each of the secondary windings is interconnected to control a different one of the pair of related controlled rectifiers 4 and 8 which must simultaneously conduct during the related half cycle that the lower line 3 is positive relative the center line. A steering diode 30 interconnects the one transformer secondary winding 28 to the gate to cathode circuit of the controlled rectifier 8. A similar steering diode 31 connects the second secondary winding 29 across the gate to cathode circuit of the rectifier 4. As previously noted, these two rectifiers conduct the phase voltage from the lower terminal to the intermediate terminal during the positive half cycle of that particular phase.

The pulse source 12 may be of any suitable construction to provide gating power for the first gate driver 13 only during the corresponding period.

When the pulse from the pulse source 12 is removed from the gating network, the transistors 22 and 20 revert to the normal or nonconducting state. The capacitor 19 is again connected to the D.C. supply for charging. This will result in a reverse current flow from that of the pulsed output to reset the core 15. The output pulse at this time is blocked by the steering diodes 30 and 31. Though not essential, bypass diode 32 and 33 may be connected in parallel with the secondary winding 28 and 29 respectively to carry the corresponding reset pulse current.

Each of the silicon controlled rectifiers 4–9 is similarly connected into the gating network and consequently the connection of a single rectifier 4 is described in detail. It will be understood however that all of the other rectifier elements are similarly interconnected into the circuit, as shown.

A suitable protective network including a paralleled resistor 34 and back biased diode 35 is connected directly between the gate 36 and cathode 37. Additionally, the gate 36 is interconnected to the corresponding winding 29 in series with a parallel current limiting resistor and a speed-up capacitor network 37a to improve the response time if some adverse noise characteristics are acceptable.

The next phase gate driver 38 for the bridge network is similarly constructed and includes a pair of related output secondary windings 39 and 40. The one secondary winding 39 of the gate driver is interconnected to the gate to cathode circuit of the rectifier 7 which as previously noted is necessarily fired to conduct the next successive phase voltage. The second winding 40 is interconnected in parallel with the output of the secondary winding 29 of the first gate driver 13 and also provides a pulse for the controlled rectifier 4. The second gate driver 38 is actuated from the pulse source 12 in proper timed sequence to conduct the next phase voltage corresponding to the voltage between the lowermost terminal and the uppermost terminal which circuit includes the previously conducting rectifier 4 and the rectifier 7. The rectifier 4 is thus insured of a double pulse once during each of the applied phase voltages to maintain the capability of continuous conduction of the high anode current either under continuous or discontinuous current conduction condition.

Each of the other gate drivers 41–44 is similarly constructed with one secondary winding being connected to the next succeeding rectifier to be fired in the phase sequence and with the other winding interconnected to the previously conducting rectifier. Thus, driver 41 provides a driver pulse to the next phase rectifier 5 and to also the previously conducting rectifier 7. Driver 42 controls rectifiers 5 and 9. Driver 43 controls rectifiers 9 and 6 and driver 44 controls rectifiers 6 and 8, after which the sequence is again repeated from driver 13.

The phase voltages and the firing of the controlled rectifiers is graphically shown in FIG. 2. Generally, only positive half cycles of the voltage wave form related to the terminals connected to the anodes of the rectifiers 4–9 are shown as conduction can only occur during such period. The curve 45 represents the applied voltage between the lower line 3 and the intermediate line 3 during which period the anodes of rectifiers 4 and 8 are at a relative positive polarity. The first firing pulse 46 is applied at the 60 degree angle, this being the first point in a three phase system that the anode is positive. The next voltage curve 47 corresponds to the next phase voltage which is applied to rectifiers 4 and 7. Rectifier 4 is again pulsed by the pulse 48 even though conducting while the rectifier 7 is pulsed by the simultaneously generated pulse 49 to initiate conduction. Current continues to flow through the armature from the second phase voltage 47 through the rectifier 4 and the rectifier 7. In fact, the rectifier 4 will not have actually turned off and only the rectifier 7 will turn on while rectifier 8 turns off. The double pulse technique however positively insures that the rectifier 4 remains fully on during the change from the initial phase to the succeeding phase and prevents possible high localized current concentrations or density as a result of the rectifier 4 tending to turn off.

The gate pulse pairs are sequentially generated by the gate drivers 13–14 in proper timed relationship. Each rectifier 4–9 is gated twice during the 120 degrees spanning the successive half cycles of the applied phases for motoring and an additional 60 degrees for regenerating. This positively insures continuity of conduction and prevents possible application of anode voltages with the partial conducting state of the controlled rectifier. This essentially eliminates failure from the high current concentration within a relatively small conducting portion of the controlled rectifier.

In operation, the pulse source 12 provides a sequential series of turn-on pulses to the gate drivers 13–14 in proper timed sequence, as shown in FIG. 2. Each pulse has a fast rise time and is of a high intensity or magnitude. Thus, applicant has found that for a motor control circuit, a high intensity gate pulse of about 5° duration and with a very rapid rise time such as 0.1 to 0.5 microsecond provides exceedingly satisfactory results. If less than full voltage output is desired, the source 12 actuates the drivers such that the trigger pulses will be time shifted to the right in FIG. 2 to apply less than full outlet voltage to the armature. In this way the voltage and consequently the current applied to the armature can be varied to vary the speed or torque output of the motor.

Although the embodiment of the invention illustrated in FIGS. 1 and 2 provides a highly satisfactory control, applicant has found further that the system can be reduced somewhat in cost and the gating action improved with a circuit such as shown in FIGS. 3 and 4 where in effect two of the pulse transformers are interconnected and wound on a single core.

Referring particularly to FIG. 3, a square loop core 50 such as shown in FIG. 1 is again provided. In FIG. 3, however, a pair of primary windings 51 and 52 are wound on the core 50. The windings 51 and 52 are wound to provide the illustrated polarities in response to a current from the upper end to the lower end and in particular provide opposite polarities such that if winding 51 sets the core 50, a corresponding current through the winding 52 resets the core. The winding 51 has its lower end connected to ground in series with a solid state electronic switch 53 and the other solid state electronic switch 54. Each of the switches 53 and 54 may be a suitable solid state switch properly triggered to provide phase sequencing from a pulse source 55 corresponding to pulse source 13. A preferred circuit is shown for switch 53 and hereinafter described.

The upper ends of the windings 51 and 52 in FIG. 3 are interconnected to each other and to the one side of a pulse capacitor 56, the other side of which is connected to ground. The common connection between the capacitor 56 and the windings 51 and 52 is also connected through a dropping resistor 57 to a D.C. power supply.

With both the switches 53 and 54 in a nonconducting or open state, the capacitor 56 charges as in FIG. 1. Thereafter, the switch 53 closes to discharge the capacitor 56 and provide a proper pulse through windings 58 and 59 which may correspond to windings 28 and 29 of FIG. 1. The switch 53 opens and the capacitor 56 recharges. The alternate switch 54 is at some subsequent time closed to discharge of the capacitor 56 through the second primary winding 52. As previously noted, winding 52 is wound to reset the core 50 while providing an output pulse to a pair of secondary windings 60 and 61 which may correspond to the windings of one of the other drivers of FIG. 1. As a result of the alternate closing of the switches 53 and 54 current is supplied alternately to the windings. This results in a setting and resetting of he core 50 as required with a square loop core device. The secondary windings 58–61 are of course close coupled to the associated primary windings 51 and 52 and interconnected through suitable steering diodes to trigger the related silicon controlled rectifiers as in FIG. 1.

The illustrated electronic switch 53 employs NPN logic and includes an input or driving NPN transistor 62 connected to pulse source 55 and an output or discharge NPN transistor 63. The transistors 62 and 63 are interconnected in a high gain switching circuit generally similar to the known Darlington circuit. The emitter of transistor 62 is connected to a negative supply in series with a resistor 64 and directly to the base of transistor 63. The collector of transistor 62 is connected to a common positive supply for transistors 62 and 63 in series with a collector resistor 65. A paralleled capacitive-resistive network 66 connects the collector of transistor 62 to ground. A clamping diode 67 connects the base of transistor 63 to ground. The collector to emitter circuit of the transistor 63 is connected between the lower end of winding 51 and ground in FIG. 3. A positive pulse to the base of transistor 62 drives it rapidly into full on and correspondingly switches transistor 63 on to discharge the capacitor 56 through winding 51 to produce the desired output pulse signals.

The winding 51 and capacitor 56 create a ringing circuit. A damping circuit including a resistor 67 in parallel with a diode 68 is connected across each of the windings 51. Applicant has found that this circuit practically eliminates any spurious signals in the secondary windings.

The dual pulse transformer of FIG. 3 can be conveniently formed as shown in FIG. 4 with a single toroidal core 69 with the winding assemblies 70 and 71 on diametrically opposite halves of the core. The one assembly 70 would include the primary winding 51 preferably wound between the secondary windings 58 and 59 and in superimposed relation to provide close coupled relation and a balanced output, and assembly 71 would similarly include the windings 52, 60 and 61. The windings are diagrammatically shown in outline form only with the connecting leads coming therefrom for purposes of simplicity and clarity of explanation.

In the structure of FIG. 4, the core is being driven to a somewhat greater degree and will result in a somewhat higher heat level and the like. However, this can be readily compensated for and will normally be well within the limits of the capacity of the structure.

In operation, the pulse transformer of FIGS. 3 and 4 might be provided and interconnected with the primary winding 51 corresponding to the illustrated primary winding 16 of the first gate driver 13. The second primary winding 52 could correspond to the corresponding portion of the fourth gate driver 42 which as shown in FIG. 2 is interconnected to control the rectifiers 5 and 9. Thus, assuming the sequence shown in FIGS. 1 and 2, the pulse input and output characteristic would be as shown in FIG. 5. The primary winding 51 would first be energized by a pulse of energy from capacitor 56 as shown at 72 in FIG. 5. This induces a positive pulse in windings 58 and 59 as shown at 73 and 74, the pulses being applied to the gates of the transistors 4 and 8. Simultaneously as a result of the coupling to the common square loop core 50, negative pulses 75 are established in the second primary winding 52 and the two related secondary windings 60 and 61. These negative pulses will of course be ineffective being blocked by the related diodes. One hundred and eighty degrees later, the rectifiers 5 and 9 are to conduct. At the appropriate time in the related phase voltage, the second solid state switch 54 is closed and the capacitor 56 now discharged through the second primary winding 52, as shown by pulse 76 in FIG. 5. This will establish a set of related pulse signals in the secondary windings as shown at 77 and 78 of FIG. 5. As a result, rectifiers 5 and 9 will now conduct. Negative pulses 79 are induced in the primary winding 51 and related secondary windings 58 and 59 but are blocked by the diodes associated with such windings.

The dual pulsing technique of the present invention particularly with a rapid rise short duration pulse provides operation of the rectifier at full rated conditions and has been found to provide exceptional results in control of an inductive load such as a motor. The input leads to the bridge rectifier are generally provided with current limiting inductances as shown to protect against damaging short circuit currents. Applicant has found that with the present invention, only small values of inductance need be provided. In an actual motor rated for up to 40 kw. individual line inductances of 20 microhenries has been found fully adequate whereas 8 millihenries is not unusual in systems not employing applicant's invention. The minimal inductances result in an appreciable cost saving.

Further, the present invention may be applied to parallel bridges to increase the output. In such case, equal current sharing characteristics are important and require simultaneous firing of both bridges. By duplicating the gate driver and transformer units and driving them from a common logic pulse source, the bridges can be simultaneously fired to insure equal division of currents and prevent any one bridge from even momentarily being required to carry full load current with a resultnig damaging $di/dt$ load.

The present invention thus provides an improved gating system for controlled rectifiers connected in circuit under conditions of a high load current being applied to the rectifier at an instant when the rectifier though on is not in a sufficiently on condition to accept such magnitude of load current. Additionally, the present invention provides a simplified and low cost dual pulsing core construction such that the system can be readily and economically applied to full wave rectifying units and the like. The present invention has been shown applied to silicon controlled rectifiers but may be applied to other gated solid state devices such as a bidirectional controlled rectifiers.

I claim:

1. A gating system for a plurality of individual rectifier means connected to a power supply in a full wave rectifying system wherein each of said rectifier means is fired during a given half cycle of the alternating current input and commutates during the successive half cycle of the alternating current input; the improvement in a pulse generating means for gating of the individual rectifier means comprising a plurality of pulse forming transformers, one for each of said rectifier means and each including a primary winding and a first secondary winding connected to gate the corresponding rectifier means, each of said transformers including a second secondary winding connected to the next rectifier means to be fired during the next succeeding half cycle of the alternating current input to produce a trailing pulse during the commutating of the related rectifier means simultaneously with the generation of a leading pulse for the next rectifier means, each of said pulse generating means including a capacitor connected essentially directly to a grounded charging source to charge a said capacitor substantially independently of the pulse transformer, and a transistor amplifying switch connected in series with the capacitor and said primary winding to selectively discharge the capacitor through the primary winding to thereby establish a pulse or induce a pulse in the corresponding secondary windings.

2. The gating system of claim 1, wherein each of said transistor amplifying switches includes a pair of transistors connected in a Darlington circuit to establish a rapidly acting switch to discharge said capacitor.

3. In a gating system for controlled rectifier means connected to a full wave rectifier system having each of said rectifier means being fired during a given half cycle of an alternating current input and commutating during the successive half cycle of the alternating current input; the imporvement in the pulse generating means for gating of the individual rectifier means comprising a plurality of first pulsing means one for each of said rectifier means and each having an input means and an output means connected to the corresponding rectifier means, a plurality of second output means one for each of said rectifier means, each of said second output means being connected to a selected first pulsing means which gates the next rectifier means to be fired during the next succeeding half cycle of the input and constructed and arranged to produce the trailing pulse during the commutating of said related rectifier means simultaneously with the generation of the leading pulse of said next rectifier means controlled by the first output means of the selected first pulsing means, each of said pulse generating means including a charge storage means connected to a charging source and a transistor amplifying switch to control the discharge of the charge storage means and formation of the related pulse, said pulsing means are paired and have a common saturable toroid core, the first pulsing means of the pair having a primary winding on a first side of the core and the second pulsing means having a primary winding on the diametrically opposite side and each pulsing means having a pair of secondary windings wound in close coupled relation to the corresponding primary winding.

4. In a gating system for controlled rectifier means connected to a full wave rectifier system having each of said rectifier means being fired during a given half cycle of an alternating current input and commutating during the successive half cycle of the alternating current input; the improvement in the pulse generating means for gating of the individual rectifier means comprising a plurality of first pulsing means one for each of said rectifier means and each having an input means and an output means connected to the corresponding rectifier means, a plurality of second output means one for each of said rectifier means, each of said second output means being connected to a selected first pulsing means which gates the next rectifier means to be fired during the next succeeding half cycle of the input and constructed and arranged to produce the trailing pulse during the commutating of said related rectifier means simultaneously with the generation of the leading pulse of said next rectifier means controlled by the first output means of the selected first pulsing means, each of said pulse generating means including a charge storage means connected to a charging source and a transistor amplifying switch to control the discharge of the charge storage means and formation of the related pulse, said rectifier means are gated rectifiers connected in a polyphase full wave bridge network and wherein said plusing means are paired to define gate drivers each of which includes a common square loop core with a pair of primary windings and secondary windings wound on said core to provide the output means, said secondary windings being close coupled to said primary windings to define a pair of pulsing means, said primary windings being wound to establish opposite fluxes in said core whereby energization of one winding sets said core and energization of the other winding resets said core.

5. The gating system of claim 4 wherein said primary windings being connected in parallel branches and in series with a common capacitor, a pair of switch means connected one in each of said parallel branches, and direct current input means connected in series with said capacitor, and means to alternately actuate said switch means.

6. The gating system of claim 4 wherein each core is a toroid core having the primary windings on diametrically opposite sides and the secondary windings wound in close coupled relation to the corresponding primary winding.

7. The gating system of claim 4 wherein said gated rectifiers are silicon controlled rectifiers connected in a three phase full wave bridge network, and pairs of second windings are wound one pair on each of said primary windings.

8. The gating system of claim 7 wherein said common square loop core is a toroid core.

References Cited
UNITED STATES PATENTS

| | | | |
|---|---|---|---|
| 3,284,689 | 11/1966 | Rosa | 321—47 X |
| 3,371,261 | 2/1968 | Hull et al. | 321—5 |
| 3,399,337 | 8/1968 | Stone | 321—5 |
| 3,416,061 | 12/1968 | Rosenberry | 321—5 |
| 3,424,970 | 1/1969 | Ross | 321—5 |

J D MILLER, Primary Examiner

W. H. BEHA, JR., Assistant Examiner

U.S. Cl. X.R.

318—345; 321—11, 47